ary Examiner—Bernard Helfin
United States Patent [19]
Strong

[11] 3,852,357
[45] Dec. 3, 1974

[54] 2-ALLYL-3-CHLORO-2-CYCLOHEXEN-1-ONES AND THEIR PREPARATION

[75] Inventor: Jerry G. Strong, Fanwood, N.J.

[73] Assignee: Mobil Oil Corporation, New York, N.Y.

[22] Filed: Jan. 18, 1973

[21] Appl. No.: 324,632

Related U.S. Application Data

[63] Continuation-in-part of Ser. No. 11,898, Feb. 16, 1970, abandoned.

[52] U.S. Cl. .............................. 260/586 R, 260/587
[51] Int. Cl. ............................................. C07c 49/48
[58] Field of Search ....................... 260/586 R, 587

[56] References Cited
UNITED STATES PATENTS

| | | | |
|---|---|---|---|
| 2,871,267 | 1/1959 | Petracek et al. | 260/586 R |
| 2,927,134 | 3/1960 | Normant et al. | 260/586 R |
| 3,114,772 | 12/1963 | Lorette et al. | 260/586 R |
| 3,331,856 | 7/1967 | Los | 260/586 R X |
| 3,431,305 | 3/1969 | Thompson et al. | 260/586 R |

Primary Examiner—Bernard Helfin
Assistant Examiner—Norman P. Morgenstern
Attorney, Agent, or Firm—Andrew L. Gaboriault; Hastings S. Trigg

[57] ABSTRACT

2-Allyl-3-chloro-2-cyclohexen-1-ones and alkyl ($C_1$–$C_3$) substituted derivatives are prepared by allylation of dihydroresorcinol, followed by chlorination with phosphorus oxychloride. They can be reacted with sodium hydrosulfide to form 2-alkyl-4-oxo-2,3,4,5,6,7-hexahydrobenzo[b] thiophenes and alkyl ($C_1$–$C_3$) substituted derivatives, which are dehydrogenated to produce alkyl substituted 4-hydroxybenzo[b] thiopenes and 2,3-dihydro derivatives thereof and converted to carbamate insecticides.

6 Claims, No Drawings

2-ALLYL-3-CHLORO-2-CYCLOHEXEN-1-ONES AND THEIR PREPARATION

CROSS-REFERENCE TO RELATED APPLICATIONS

This application is a continuation-in-part of copending application Ser. No. 11,898, filed Feb. 16, 1970 now abandoned.

BACKGROUND OF THE INVENTION

1. Field of the Invention

This invention is concerned with novel alkyl substituted 2-allyl-3-chloro-2-cyclohexen-1-ones and their preparation.

2. Description of the Prior Art

Insofar as is now known the compounds of this invention have not been described in the prior art.

SUMMARY OF THE INVENTION

This invention provides 2-allyl-3-chloro-2-cyclohexen-1-ones having the formula:

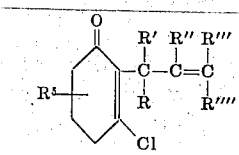

wherein R, R', R'', R''', R'''' and $R^5$ are hydrogen or $C_1$–$C_3$ alkyl.

It also provides a method for preparing 2-allyl-3-chloro-2-cyclohexen-1-ones that comprises reacting dihydroresorcinol with an allyl compound having the formula:

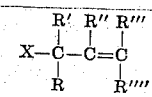

wherein R, R', R'', R''', and R'''' are hydrogen or $C_1$–$C_3$ alkyl and X is Br or Cl to form a 2-allyl-1,3-cyclohexanedione in alkaline medium and reacting said 2-allyl-1,3-cyclohexanedione with phosphorus oxychloride.

DESCRIPTION OF SPECIFIC EMBODIMENTS

The compounds of this invention are 2-allyl-3-chloro-2-cyclohexen-1-one and derivatives thereof having alkyl ($C_1$–$C_3$) substituents on the allyl side chain and the cyclohexenone ring. For simplicity and uniformity in nomenclature, the derivatives will be named on the basis of the allyl side chain. Typical compounds are:

2-allyl-3-chloro-2-cyclohexen-1-one;
2-methallyl-3-chloro-2-cyclohexen-1-one;
2-(2-ethylallyl)-3-chloro-2-cyclohexen-1-one;
2-(2-propylallyl)-3-chloro-2-cyclohexen-1-one;
2-(3-methylallyl)-3-chloro-2-cyclohexen-1-one;
2-(2,3,3-trimethylallyl)-3-chloro-2-cyclohexen-1-one;
2-(2,3-dimethylallyl)-3-chloro-2-cyclohexen-1-one;
2-(3,3-dimethylallyl)-3-chloro-2-cyclohexen-1-one;
2-(3-ethylallyl)-3-chloro-2-cyclohexen-1-one;
2-(2-methyl-3-ethylallyl)-3-chloro-2-cyclohexen-1-one;
2-(1-methylallyl)-3-chloro-2-cyclohexen-1-one;
2-(1-methyl-1-ethylallyl)-3-chloro-2-cyclohexen-1-one;
2-(1,2-dimethylallyl)-3-chloro-2-cyclohexen-1-one;
2-(1-ethylallyl)-3-chloro--2--cyclohexen-1-one;
2-(1,1-diethylallyl)-3-chloro-2-cyclohexen-1-one;
2-(1,1-dimethylallyl)-3-chloro-2-cyclohexen-1-one;
2-(1-propylallyl)-3-chloro-2-cyclohexen-1-one;
2-allyl-3-chloro-4-propyl-2-cyclohexen-1-one; and
2-methallyl-3-chloro-5-methyl-2-cyclohexen-1-one.

One of the starting materials for preparing the compounds of this invention is a dihydroresorcinol (1,3-cyclohexanedione). These materials are available commercially. They are readily prepared by the reduction of a resorcinol in the presence of Raney Nickel.

Another reactant is allyl bromide or chloride or an alkyl ($C_1$–$C_3$) derivative having the formula:

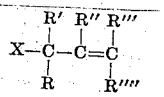

wherein R, R', R'', R''', and R'''' are hydrogen or $C_1$–$C_3$ alkyl and X is Br or Cl. Non-limiting examples are allyl bromide; allyl chloride; methallyl bromide; methallyl chloride; 2-ethylallyl bromide; 2-propylallyl chloride; 3-methylallyl bromide; 2,3,3-trimethylallyl chloride; 2,3-dimethylallyl bromide; 3,3-dimethylallyl chloride; 3-ethylallyl bromide; 2-methyl-3-ethylallyl chloride; 1-methylallyl bromide; 1-methyl-1-ethylallyl chloride; 1,2-dimethylallyl bromide; 1-ethylallyl chloride; 1,1-diethylallyl bromide; 1,1-dimethylallyl chloride; and 1-propylallyl bromide.

The allylation of dihydroresorcinol is carried out by reacting dihydroresorcinol with the allyl bromide or chloride reactant in an alkaline (NaOH, KOH) medium. The reaction takes place at room temperature. Typical procedures are described in Chem. Ber., 85, 1061-7 (1952) (C.A. 47:12228i) and Chem. Ber., 94, 2394 (1961) (C.A. 56:1361c). The following examples illustrate the techniques involved.

EXAMPLE 1

Allyl bromide (59.5 g., 0.49 mole) was added gradually to a cooled solution of 64.8 g. (0.58 mole) 1,3-cyclohexanedione and 32.4 g. (0.58 mole) potassium hydroxide in 130 cc. water, using rapid stirring. When clumps of needlelike crystals started to form, addition of allyl bromide was stopped and 20 per cent aqueous potassium hydroxide was added until solution was effected. Addition of allyl bromide was then completed in about ten hours. The reaction mixture was added to 200 cc. of normal sodium hydroxide. The solution was extracted with 3 portions of petroleum ether. The remaining aqueous solution was ice cooled and adjusted to pH 5 with concentrated hydrochloric acid. Crystals were filtered off and water washed. Recrystallization from methanol/water (1:3) gave fine needles of 2-allyl-1,3-cyclohexanedione melting at 128°C.

EXAMPLE 2

A 91 g. (1.0 mole) portion of methallyl chloride was added to a solution of 123 g. (1.1 mole) of 1,3-cyclohexanedione and 62 g. (1.1 mole) of potassium hydroxide in 250 ml. water using rapid stirring. The reaction mixture was stirred at ambient temperature for six days before sufficient 20 per cent potassium hydroxide was added to effect solution. The basic solution was extracted with 3 portions of petroleum ether, and the remaining aqueous solution was cooled and adjusted to pH 5 with concentrated hydrochloric acid. The separated crystals were collected, washed with water, and dried to afford 91 g. of 2-methallyl-1,3-cyclohexanedione melting at 113°–114°C.

The 2-allyl-3-chloro-2-cyclohexen-1-one or an alkyl derivative is prepared by the reaction of phosphorus oxychloride with the 2-allyl-1,3-cyclohexanedione. The techniques involved are demonstrated in the following examples:

EXAMPLE 3

A 91 g. (0.6 mole) portion of phosphorus oxychloride was added dropwise to a solution of 46 g. (0.3 mole) of 2-allyl-1,3-cyclohexanedione and 52 g. of N,N-dimethylaniline in 300 ml. of chloroform so as to control the temperature near 40°C. Following 4 hours of stirring at ambient temperature, the reaction solution was gently concentrated and cautiously poured over cracked ice so as to control the temperature near 40°C. The resulting mixture was thoroughly extracted with ether, and the ethereal solution was washed with 5 per cent sodium hydroxide and with brine, dried and concentrated. The clear liquid obtained weighed 40 g. and was distilled through a short path apparatus to afford 34 g. (0.2 mole; 70 percent) of 2-allyl-3-chloro-2-cyclohexen-1-one: BP 66°–69° (0.2 mm.); λ(film) 5.98 (S)μ.

EXAMPLE 4

A 121 g. (0.8 mole) portion of phosphorus oxychloride was allowed to react with 66 g. (0.4 mole) of 2-methallyl-1,3-cyclohexanedione and 70 g. of N,N-dimethylaniline in 400 ml. of chloroform using the same procedure as described in Example 3. Obtained by the same isolation procedure was 45 g. (0.25 mole; 62 percent) of 2-methallyl-3-chloro-2-cyclohexen-1-one: BP 64-70 (0.15 mm.), λ(film) 5.95,μ.

The compounds of this invention can be reacted with sodium hydrosulfide to form 2-alkyl-4-oxo-2,3,4,5,6,7-hexahydrobenzo[b]thiophenes and $C_1$–$C_3$ alkyl substituted derivatives, as described in copending application Ser. No. 11,896, filed Feb. 16, 1970 now U.S. Pat. No. 3,743,655. The 2-alkyl-4-oxo-2,3,4,5,6,7-hexahydrobenzo[b]thiophenes and $C_1$–$C_3$ alkyl substituted derivatives are dehydrogenated to produce 4-hydroxybenzo[b]thiophenes and 2,3-dihydro derivatives thereof. The dehydrogenation can be carried out in the vapor phase, in the absence of added hydrogen, using water in the feed and a metal oxide catalyst of Groups VI B and VIII (iron sub-group) metals, as defined in U.S. Pat. No. 3,345,382. The dehydrogenation can also be carried out in the liquid phase by applying the procedures of U.S. Pat. No. 3,317,552 i.e., by heating a solution of elemental sulfur and the oxo-compound in a solvent for both the sulfur and the oxo-compound. The resulting 4-hydroxy compound can be converted to carbamate insecticides. Typically the carbamates are formed by reacting the hydroxy compound with an isocyanate, such as alkylisocyanate, or with phosgene and then with an amine, cf. U.S. Pat. No. 3,288,673.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. 2-allyl-3-chloro-2-cyclohexen-1-ones having the formula:

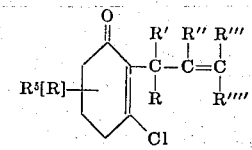

wherein R, R', R'', R''', R'''' and $R^5$ are hydrogen or $C_1$–$C_3$ alkyl.

2. The compound of claim 1, wherein R, R5, R', R'', R''' and R'''' are hydrogen.

3. The compound of claim 1, wherein R'' is methyl and R, R5, R', R''', and R'''' are hydrogen.

4. A method for preparing 2-allyl-3-chloro-2-cyclohexen-1-ones that comprises reacting dihydroresorcinol with an allyl compound having the formula:

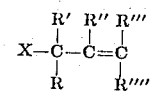

wherein R, R', R'', R''' and R'''' are hydrogen or $C_1$–$C_3$ alkyl and X is Br or Cl in alkaline medium to form a 2-allyl-1,3-cyclohexanedione, separating said 2-allyl-1,3-cyclohexanedione and reacting it with phosphorus oxychloride by gradually adding an N,N-dimethylaniline-chloroform solvent solution of phosphorus oxychloride to said 2-allyl-1,3-cyclohexanedione at a temperature of about 40°C, concentrating the reaction mixture and extracting a 2-allyl-3-chloro-2-cyclohexen-1-one with ether.

5. The method of claim 4, wherein R, R', R'', R''', and R'''' are hydrogen and X is Br.

6. The method of claim 4, wherein R'' is methyl, R, R', R''', and R'''' are hydrogen and X is Cl.

* * * * *